May 5, 1931.  P. G. VON HILDEBRANDT  1,803,443
PROCESS OF PREPARING FIBER FROM WOOD AND WOOD WASTE
Filed Nov. 20, 1928  3 Sheets-Sheet 3
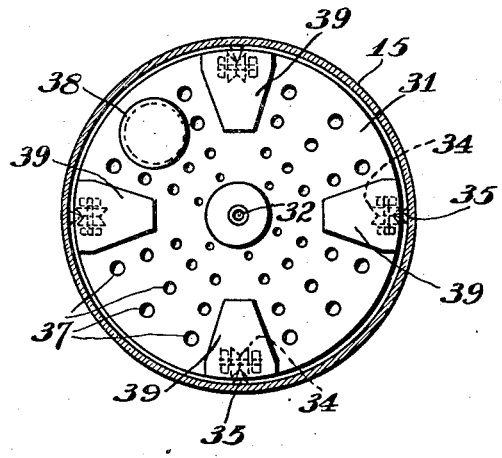
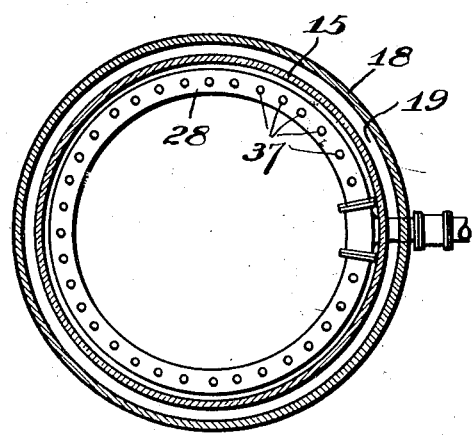

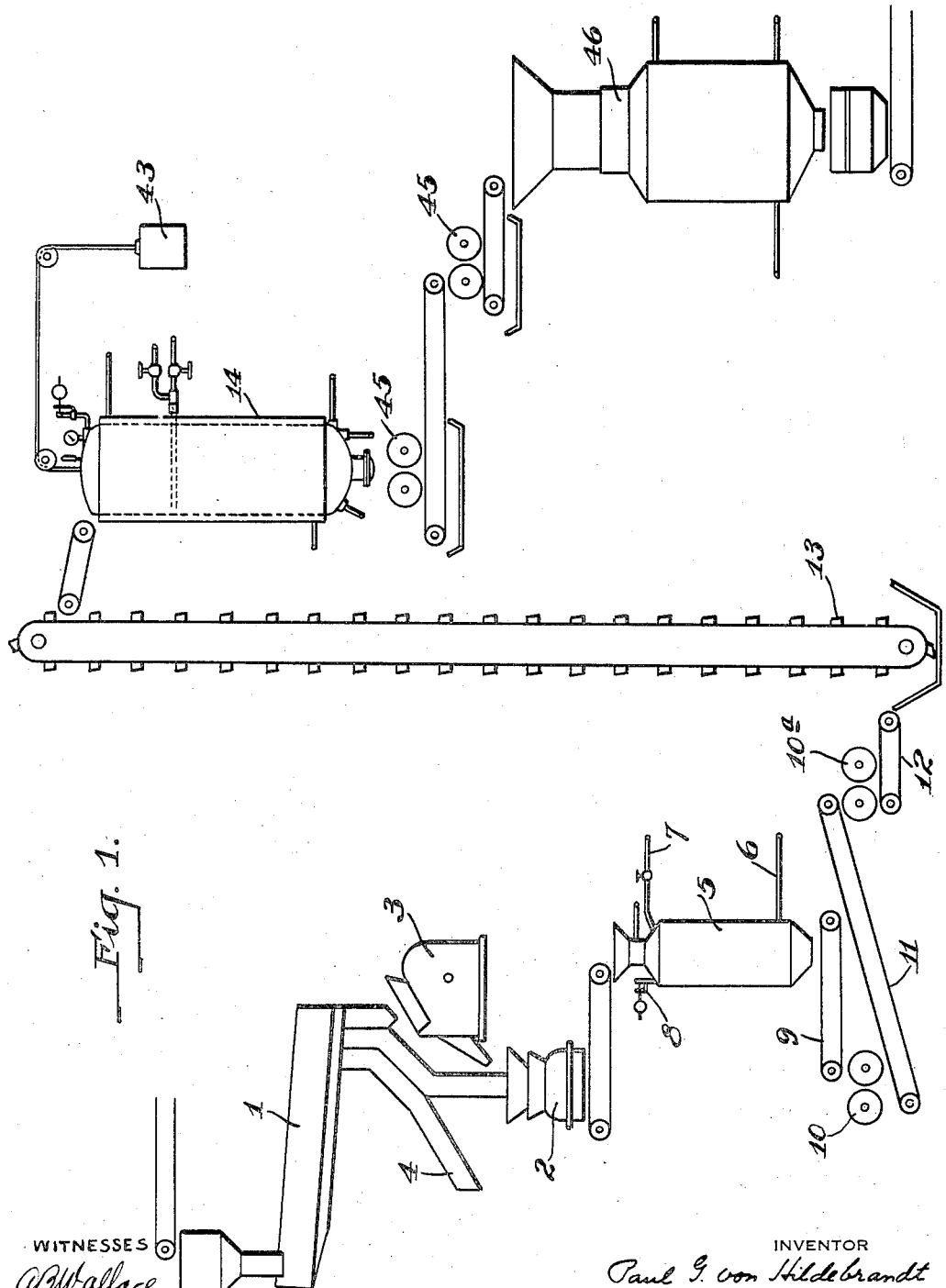

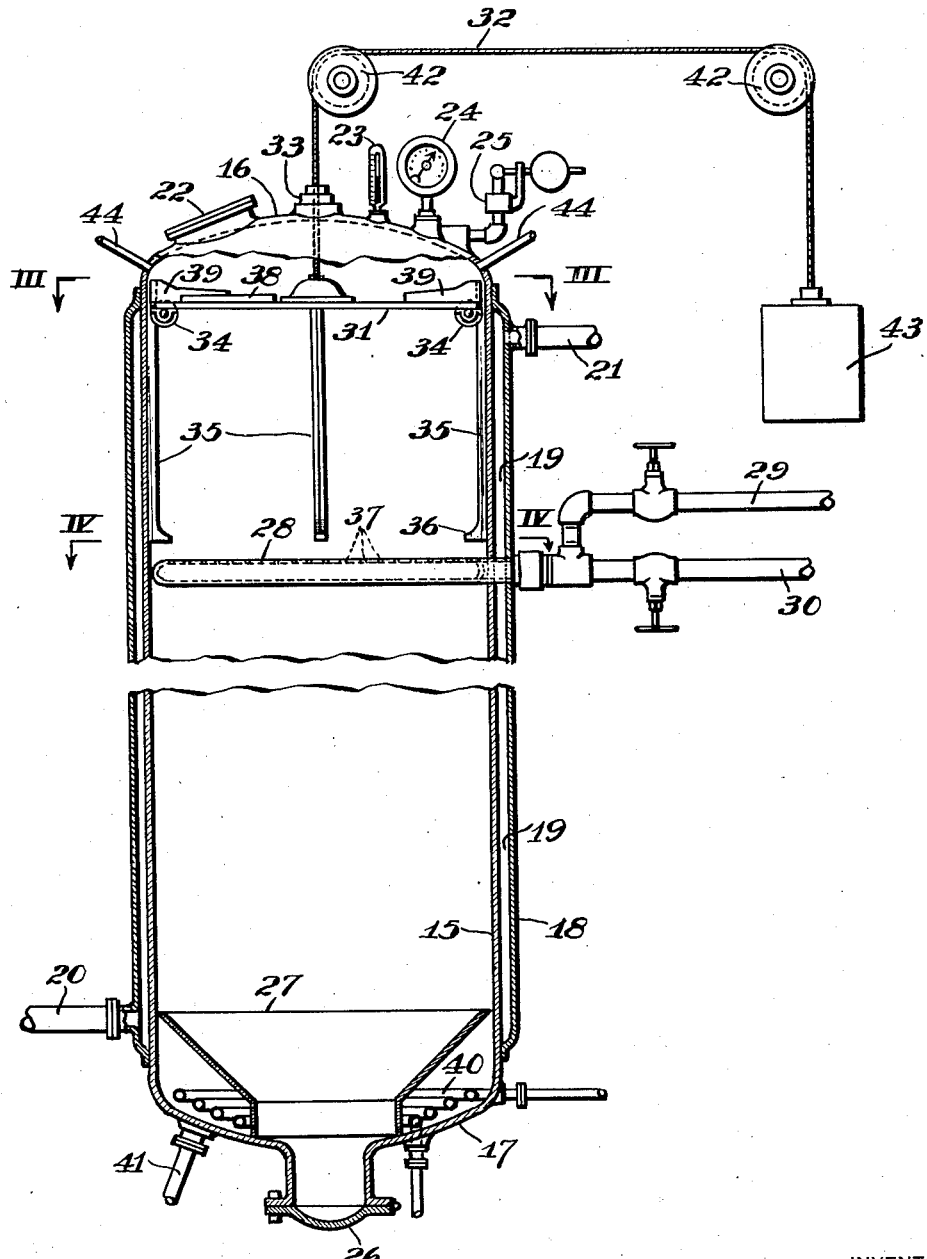

Patented May 5, 1931

1,803,443

UNITED STATES PATENT OFFICE

PAUL G. VON HILDEBRANDT, OF PITTSBURGH, PENNSYLVANIA, ASSIGNOR TO HOWARD B. SALKELD, OF PITTSBURGH, PENNSYLVANIA

PROCESS OF PREPARING FIBER FROM WOOD AND WOOD WASTE

Application filed November 20, 1928. Serial No. 320,601.

This invention relates to the production of fiber or pulp from wood by chemical treatment.

An object of the invention is to provide a process of producing chemical pulp which is applicable to wood of all kinds, including wood waste, which is simple and readily performed, and in which no de-barking of the wood is necessary.

A further object is to provide a process of the type referred to which produces a higher yield of fiber than prior processes, and a fiber which combines the desirable characteristics of those resulting from prior chemical processes and is especially suited for fabrication into board for insulating and allied structural uses.

Among others, it is an especial object of the invention to so adapt the soda process to the treatment of any kind of whole wood and wood waste as to minimize cell destruction during digestion, reduce the digestion time, and produce a higher yield of longer fiber than has formerly been possible with the soda process.

Substantially all chemical pulp has heretofore been produced by the sulfite process, which provides a long and strong, but harsh fiber, or by the soda process, which gives a softer fiber, but which, because of profound cell destruction characteristic of this process, is shorter than sulfite fiber. Sulfite process installations are expensive and their upkeep is high. The wood used in either process must be free from bark before treatment, neither process is applicable to all kinds of wood, and the pulp yield of either does not in general exceed about 50 per cent. Large amounts of wood in the form of slabs, chips, etc., annually result as waste in logging camps, mills, and other wood working operations, but it has not been possible to treat such waste materials by chemical processes, and as a consequence a large potential source of wood fiber has thus far been relatively useless.

The invention may be described in connection with the accompanying drawings, in which Fig. 1 diagrammatically shows the steps in the preferred embodiment of the process; Fig. 2 is a vertical view, partly in section, of an improved digester used in connection with the process; and Figs. 3 and 4 are horizontal sections taken on lines III—III and IV—IV, respectively, of Fig. 2.

I have found that the disadvantages of the prior wood-fibration processes may be overcome and high yields of long, soft fibers of pure cellulose may be produced from whole wood or whole wood waste by preliminarily opening the grain of the wood, and then digesting it with an incrustant-removing agent while compacting it under mechanical pressure. The reagent permeates the wood quickly, thus reducing the digestion period. By confining the material during digestion, agitation by steam or other action during cooking is prevented, and the cell-destructive action, which especially characterized the soda process, is substantially eliminated. These two factors combine to give higher yields than have ordinarily been obtained. Although not so limited, the process according to the invention is especially applicable to the soda process, and will be described in its application thereto.

As used in the specification and claims the term "whole wood" applies to wood or wood waste in its natural state. That is, the wood has not been de-barked, freed from knots, or treated otherwise than by mechanically subdividing it, to prepare it for digestion. The term "incrustants" is used herein to describe concisely the noncellulosic material, such as gums and resins, lignin, carbohydrates, or other substances which exist in the wood as intra- or inter-cellular material, or in the bark and other components of the wood, and which must be removed in order to free the cellulose fibers.

The invention is applicable to substantially any kind of wood, and to all forms of wood refuse resulting from logging, milling, or other operations. The whole wood is used, no removal of bark being necessary or desirable. If necessary, the wood is preliminarily chipped, it being preferred in most cases to use chips from about one-quarter inch up to one or two inches in size. The wood is passed to a grader 1, of any suitable type, which passes properly sized material to any desired point, such as a weigher 2. The oversize material is passed to a hogger 3, where it is reduced to the proper size and also passed to the weigher. Wood meal and other undersize material passes from the grader through a conduit 4, and is burned or otherwise disposed of.

In the preferred practive of the invention a suitable charge of graded wood is placed in a pressure digester 5, which may be and preferably is of the vertical cylindrical shell type, provided with a steam inlet 6 and outlet 7, and with a bottom discharge valve, not shown. Digesters of this type are commonly used in the art. The material is now digested with a reagent adapted to incipiently attack the incrustants and to open the grain, the reagent used being preferably mild in its action so as to remove but a minor portion of the incrustants, and without exerting any chemically destructive action upon the cellulose fibers.

For this purpose, a mildly alkaline reagent is preferred, lime being the most suitable. For most whole woods or wood refuse, this reagent may be used in the proportion of about 21 pounds of slaked lime and about 54 gallons of water to each 100 pounds of chips. After the chips and reagent have been introduced and the digester closed, steam is introduced to heat the materials. The lime reagent referred to will form a suspension, commonly known as milk of lime, and it is preferred to introduce the steam directly into the bottom of the digester in order to keep the undissolved lime in suspension. This produces uniform action through the mass. The pressure in the digester is raised to about 150 to 160 pounds gauge, and for ease of regulation a safety valve 8 may be provided, which releases waste steam when the desired pressure is reached.

With most wood materials, under the conditions described, the attack of the incrustants and opening of the grain will be sufficient after digesting for about one hour. The pressure in the digester is now relieved and the preliminarily softened wood discharged and passed by a belt conveyor 9 to a set of rolls 10, and thence by a second conveyor 11 to another set of rolls 10a. These rolls are preferably of the grooved type used for crushing sugar cane, their purpose being to crush the wood and further open the grain for the next, or fiber-liberating, step. The softened material is washed with water, preferably during the rolling, to remove residual lime.

The perliminarily softened material is now digested with a reagent to remove a further portion, preferably the balance, of the incrustants and free the fiber, and a special feature of the invention resides in the method and means used to accomplish this step.

In prior processes, in which the wood, in its natural condition, was loosely contained in the digestion apparatus, relatively high concentrations of incrustant solvent were necessary and the solvent penetrated the wood slowly. Also steam was passed directly into the digester to cook its contents, and the agitation of the material caused in this manner combined to disrupt the fibers and reduce the yield. These disadvantageous features were especially apparent in the soda process, from which only short fiber was obtained. I have found that these deleterious effects can be minimized, the yield increased, and a superior fiber produced, by conducting the fiber-liberating step in such a way as to maintain the wood under mechanical pressure during the digestion.

For the fibration step it is preferred to use the digester 14, Fig. 1. It comprises a vertical cylindrical shell 15, Fig. 2, having welded or otherwise attached to its ends, a top 16 and bottom 17. A jacket 18 surrounds the body of shell 15, and is connected thereto, as by welding, to form a steam chamber 19 surrounding the inner shell. The jacket is provided with a steam inlet 20 and outlet 21. A manhole 22 is provided in the top to receive crushed and softened wood from conveyors 12 and 13, this opening being closed by a bolted cover, or in any other suitable manner. A thermometer 23, pressure gauge 24, and safety valve 25 are also disposed in the top 16. The bottom 17 is provided with a suitable discharge valve 26, and a feed cone 27 of perforated sheet metal disposed in the lower end of the digester directs the material into the valve and assists in evacuating the contents of the digester. The reagent is preferably introduced into the digester through a perforated ring pipe 28 disposed therein, which is connected externally to a reagent supply, for example a water line 29 and a chemical supply line 30. In this manner the reagent may be distributed uniformly throughout the wood.

According to the invention the free surface of the contents of the digester is confined under mechanical pressure. Various means may be used to accomplish this, but it is preferred to use that shown. This pressure-applying means comprises a metal plate 31 suspended within the digester by a cable 32 which passes through a packing gland 33 centrally disposed in top 16, the cable being attached to the center of the plate. The under side of this plate is provided with four symmetrically disposed grooved rollers 34, which engage V-shaped guides 35 extending downwardly from the top inside of shell 15. The ends of the guides may be flared as at 36, to provide stops. The plate is provided with a plurality of perforations 37, preferably of increasing diameter progressively from the center of the plate to permit uniform fluid circulation. An opening provided with a cover 38 is situated beneath manhole 22. The plate may be made sufficiently heavy to effect the desired compacting of a charge placed therebelow. However it is preferred to use a relatively light plate and to place heavy weights 39 on its top, these weights preferably being uniformly arranged above the rollers.

Because of its high solvent power for the incrustants, and because it gives a soft, strong fiber, it is preferred to use caustic soda in the fiber-liberating step. By virtue of the compression of the wood, and because the grain has been previously opened, the reagent used is able to penetrate more quickly than in prior processes, and I have found that less concentrated solutions than commonly used heretofore may be employed. Generally, about 15 pounds of caustic soda in 55 gallons of water to each 100 pounds of moist softened wood will produce satisfactory results.

The digester having been charged, cover 38 is closed and locked, and the cover of manhole 22 is bolted down. Weighted plate 31 is lowered into contact with the wood to confine its entire surface and compact the wood under mechanical pressure. Steam is admitted to jacket 19, and in order to assist in heating of the charge, steam is also passed through a coil 40 disposed below guide 27, this coil heating the charge from the bottom and in the region below the jacket. In the case of most woods treated with lime in the manner just described, the wood will be sufficiently cooked in about one and one-half hours after the pressure within the digester has reached about 125 to 160 pounds gauge.

During processing the charge may change in bulk, by expanding during heating or by penetration by the solution, or it may shrink as the reagent progressively exerts its fiber-liberating action. The soda quickly penetrates each chip, and the pressure of the weight opposes swelling of the wood, and if the wood shrinks, the weight follows this movement. In consequence, pressure is applied continuously to the wood, so that the changes in volume are slow, and no agitation can take place. Also, because the material is confined under pressure, the fibers cannot be expanded by steam or other fluid pressure formed in digestion. As a result of these factors, the reagent acts more quickly than in prior processes, and disruptive action is substantially eliminated.

In most prior digestion processes steam is passed directly into the charge, and this is undesirable because condensation of the steam dilutes the liquor, and also because steam when discharged into a charge of this nature may and does disintegrate the fibers. For these reasons it is preferred to use indirect heating in the practice of the invention, this being accomplished in the digester shown by the use of the steam jacket.

When cooking is complete, the pressure is relieved, as by opening the safety valve, the liquor is drawn off through a drain pipe 41 provided in the bottom, and the weighted plate is lifted, cable 32 being passed over sheaves 42 and connected to a counter-weight 43 to assist in its movement. Valve 26 is then opened and the pulped material discharged, air pressure supplied through pipes 44 being used if necessary.

From the digester the pulped wood may pass to sets of rolls 45, Fig. 1, similar to rolls 10, to break up any undisintegrated cell aggregates, and thence to a beater or washer 46 of any suitable type, after which it is ready for fabrication in any desired manner.

In many prior processes the digesters are cooled more or less between digestions, necessitating slow reheating. According to the preferred practice of this invention the reagents are added hot, so that the time loss in cooling and reheating the digesters is materially reduced and practically continuous operation of the digesters becomes possible.

The fiber provided by this process has been subjected to substantially no mechanically disruptive action, and because of the quick and ready attack by the soda, or other reagent used in the fiber-liberating step, there is substantially no chemically destructive chemical attack on the cellulose fibers. In consequence, the fibers consist of substantially pure cellulose, and they are soft and strong. Furthermore, both because they are not chemically attacked, and because mechanical comminution is prevented, the fibers are long. That is, they retain their natural length, governed, of course, by the size of the chip. Also, the yields are considerably improved, as compared to prior processes, and I am able to produce pulp equivalent to about 80 to 90 per cent of the wood used, this being considerably more than is usually obtained. The process requires much less time than prior processes, in which digestion may require up to about 30 hours. Further economies result from the use of whole wood, which eliminates de-barking operations and increases the amount of fiber-producing material which can be processed. The invention is also valuable because the process is applicable to any kind of wood.

The fibers produced in accordance with the invention thus retain their natural characteristics, such as length and softness. The fiber produced is particularly desirable for use in making boards, and I have found that boards for thermal or sound insulation and similar purposes may be produced therefrom which are superior to the materials now commonly used to those ends.

It will be understood that it is not necessary to process different kinds of wood singly, but mixtures of woods, and conglomerate wood waste may be treated. The operating conditions may vary somewhat, but those described will in general be found to be satisfactory for most woods.

Material described but not claimed herein is claimed in separate applications.

I claim:—

1. A process of preparing pulp from wood material, comprising digesting the wood with a reagent adapted to partially attack the incrustants and open the grain, subsequently confining the preliminarily softened wood under mechanical pressure in an indirectly heated digester, and while thus confined digesting with a second reagent to remove a further amount of the incrustants and free the fiber.

2. A process of preparing pulp from wood, comprising digesting the wood with a reagent adapted to partially attack the incrustants and open the grain, subsequently confining the preliminarily softened wood under mechanical pressure, and while thus confined digesting with a solution of a strong alkali to remove the balance of the incrustants and free the fiber.

3. A process of preparing pulp from wood, comprising digesting the wood with a reagent adapted to partially attack the incrustants and open the grain, subsequently confining the preliminarily softened wood under mechanical pressure, and while thus confined digesting with a solution containing sodium hydroxide to remove the balance of the incrustants and free the fiber.

4. A process of preparing pulp from wood, comprising digesting the wood with a weakly basic reagent to partially attack the incrustants and open the grain, mechanically compacting the preliminarily softened wood and while thus compacted digesting with a dilute solution of sodium hydroxide to remove the balance of the incrustants and free the fiber.

5. A process of preparing long cellulose fiber from whole wood, comprising digesting the wood without removing bark and the like in a closed container with milk of lime to partially remove incrustants and open the grain, washing the softened material to remove the lime and passing the material through rolls to further open the grain, confining the thus softened material under mechanical pressure in a closed container and digesting with sodium hydroxide solution to remove the balance of the incrustants and free the fiber.

6. A process of preparing long and pure cellulose fiber from whole wood including bark and the like, comprising placing the wood in the form of chips in a closed container, digesting the wood with milk of lime under a gauge pressure of about 150 to 160 pounds per square inch to incipiently attack the incrustants and open the grain, passing the softened chips through rolls and washing to remove the residual lime, confining the preliminarily softened material in a digester under mechanical pressure, and while thus confined digesting under a gauge pressure of about 125 to 160 pounds per square inch with a dilute solution of sodium hydroxide to remove the balance of the incrustants and free the fiber.

7. A process of preparing pulp from whole wood including bark and the like, comprising digesting the wood in the form of chips in a closed container with lime in the proportion of about 100 pounds of chips, about 54 gallons of water and about 21 pounds of slaked lime, to incipiently attack the incrustants and open the grain, washing the softened chips to remove residual lime, confining the softened chips under mechanical pressure in a digester, and while thus confined digesting with sodium hydroxide solution in the proportion of about 100 pounds of material to about 15 pounds of caustic soda in about 55 gallons of water to remove substantially all of the incrustants and free the fiber.

8. A process of preparing pulp from wood including bark and the like, comprising digesting the wood in the form of chips under about 150 to 160 pounds gauge pressure for about one hour with milk of lime, relieving the pressure, withdrawing the softened chips, crushing and washing to remove residual lime, confining the softened and washed material under mechanical pressure and while thus confined digesting with dilute sodium hydroxide solution under about 125 to 160 pounds gauge pressure to free the fiber, whereby to produce soft, substantially pure cellulose fibers the major portion of which retain their natural characteristics.

9. A process of preparing pulp from whole wood including bark and the like, comprising digesting the wood in the form of chips under about 150 to 160 pounds gauge pressure for about one hour with milk of lime, relieving the pressure, withdrawing the softened chips, crushing and washing to remove residual lime, placing the softened and washed material in a vertical digester, compacting the material by applying a weight to its free surface, said weight being adapted to permit circulation of vapor in the digester, and while thus compacted removing the balance of the incrustants to free the fiber by digestion with dilute sodium hydroxide solution under about 125 to 160 pounds per gauge pressure.

10. A process of preparing pulp from whole wood including bark and the like, comprising digesting the wood in the form of chips with a reagent adapted to incipiently attack the incrustants, washing to remove the residue of said reagent, placing the softened material in a digester, applying a perforated weight to the surface of the material, and while thus compacted, digesting with a dilute solution of an alkali metal hydroxide.

11. A process of preparing soft cellulose fibers from whole wood waste in the form of chips, comprising digesting the chips under a gauge pressure of about 150 to 160 pounds per square inch for about one hour with milk of lime in the proportion of about 54 gallons of water and about 21 pounds of slaked lime to about 100 pounds of chips, relieving the pressure, withdrawing the softened material from the digester, passing said material through rolls to open the grain and simultaneously washing to remove the residual lime, placing the softened and washed material in a vertical digester, applying a perforated weight to the surface of the material to compact it under high pressure, and while thus compacted removing the balance of the incrustants to free the fiber by digestion for about one and one-half hours at a gauge pressure of about 125 to 160 pounds per square inch with a dilute solution of sodium hydroxide in the proportion of about 100 pounds of moist softened material to solution of about 15 pounds of caustic soda in about 55 gallons of water.

In testimony whereof, I hereunto sign my name.

PAUL G. von HILDEBRANDT.